Patented Nov. 24, 1953

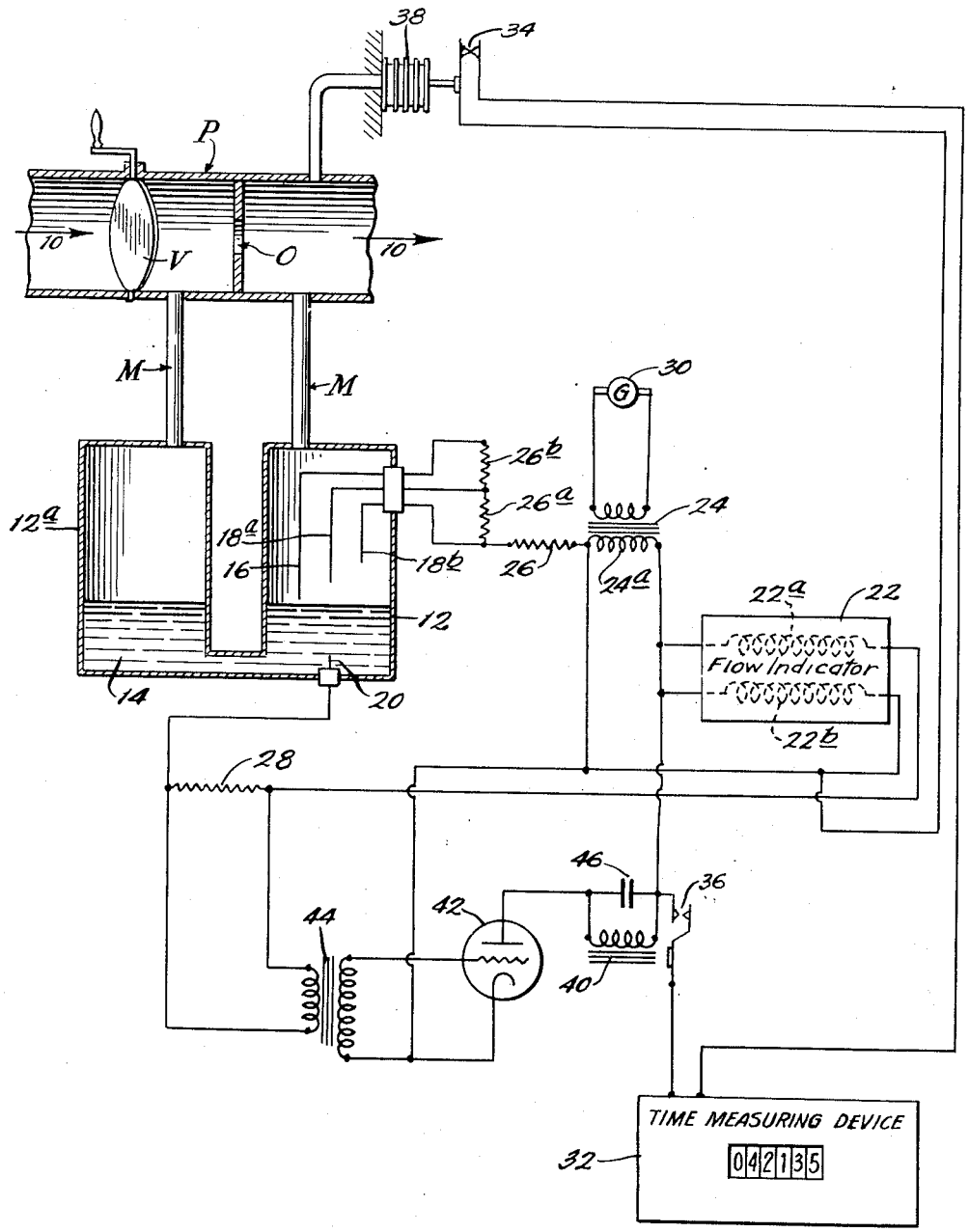

2,660,057

UNITED STATES PATENT OFFICE 2,660,057

FLOW MEASURING DEVICE

Robert A. Ackley, San Diego, Calif., assignor to Republic Flow Meters Company, Chicago, Ill., a corporation of Illinois Application November 20, 1948, Serial No. 61,257

8 Claims. (Cl. 73—198)

My invention relates to a fluid flow measuring device and more particularly to a device which may be used with an orifice type fluid meter to measure fluid flow outside the limits of accurate operation thereof.

Fluid flow meters of the orifice type utilize the pressure drop across an orifice to measure the quantity of fluid flow. These possess many advantages but are subject to the disadvantage that they are incapable of accurately responding to small fluid flows. This is a consequence of the fact that the rate of fluid flow through an orifice varies as the square root of the pressure differential thereacross and the flow indicating elements are responsive directly to that pressure. Thus, as the flow rate decreases to small values, the pressure differential becomes disproportionately smaller and the instrument becomes incapable of responding thereto.

I have discovered that when orifice type flow meters are used to measure the integrated value of a fluid flow, such as process steam, in actual industrial operations, the flow is usually within the effective range of the meter when the process is in operation and when the process is not in operation the rate of steam flow is reasonably close to a fixed, known, small value associated with standby conditions of operation if steam is being used at all. The present invention takes advantage of this fact by providing means responsive to the time this predetermined small flow takes place in addition to the conventional orifice type flow meter which accurately measures steam flow under other conditions.

It is therefore a general object of the present invention to provide a device suitable for use with an integrating fluid flow meter having an inaccurate range of operation to measure fluid flow when flow in that range takes place.

A more specific object of the present invention is to provide a device suitable for use with an integrating orifice type fluid flow meter to measure integrated fluid flow when fluid is flowing at a low rate.

Another object of the present invention is to provide a device suitable for use with an integrating orifice type fluid flow meter and operative in the range of fluid flow rates wherein the orifice type fluid flow meter is ineffective.

Yet another object of the present invention is to provide a device for use with an integrating orifice type fluid flow meter to measure fluid flow when it is less than the minimum accurate range of the meter and which includes elements operative to prevent any indication when fluid flow is completely shut off.

My invention further resides in providing a simple and effective device which may be attached to a conventional orifice type fluid flow meter without altering the same and which measures fluid flow when the rate of fluid flow is below the accurate range of the orifice type meter.

The novel features which I believe to be characteristic of my invention are set forth with particularity in the appended claims. My invention itself, however, may best be understood by reference to the following description taken in connection with the accompanying drawing, in which the single figure shows a typical orifice type fluid flow meter to which is connected a mechanism constructed in accordance with the principles of the present invention.

Referring now to the figure there is shown at P a pipe having a hand operated butterfly shut-off valve V and a diaphragm defining an orifice O. This pipe may, for example, supply steam to a manufacturing plant for use in conducting operations therein and for heating purposes. The resultant steam flow takes place in the direction of arrows 10.

In order to measure the total heat value of the steam flow through pipe P, and thus, for example, to measure the amount to be paid by the consumer therefore, it is necessary to provide elements responsive to the integrated time rate of flow of the steam. Conventionally, these elements include a flow responsive unit or device shown herein as a manometer tube M in fluid communication with opposite sides of the diaphragm and having a pair of communicating fluid chambers 12 and 12a in which a conducting fluid 14, such as mercury, is disposed.

An electrical indication of the pressure drop across the diaphragm and orifice O is provided by a plurality of electrodes 16, 18a and 18b which are insulatingly supported in chamber 12 and extend downwardly toward the surface of the fluid therein. These define a series of stepped contact elements operative sequentially to contact the fluid surface as the pressure drop across the diaphragm and orifice O increases. That is, as the rate of fluid flow through pipe P becomes greater the pressure drop across orifice O increases and fluid 14 flows from chamber 12 to chamber 12a. This causes the fluid level in the latter chamber to rise and successively contact electrodes 16, 18a and 18b.

A fixed electrode 20 is in constant electrical contact with the fluid 14. Consequently, increasing fluid flow in pipe P causes a circuit connection to be sequentially established between electrode 20 and the electrodes 16, 18a and 18b.

A flow indicator or meter 22 is electrically connected to the contact elements or electrodes 16, 18a, 18b, and 20 to indicate the integrated time rate of steam flow. This meter may, for example, include a chart bearing a scale and which is moved across a stylus in accord with time. The stylus is movably supported and is moved across the chart in accord with the degree of circuit contact between electrodes 16, 18a and 18b and the fluid 14.

In one form of flow indicator or meter 22, two coils are provided, these being indicated at 22a and 22b. These coils are mounted adjacent and substantially concentric relative to each other and a stylus-moving soft iron armature is mounted for shifting movements into and out of the cylindrical space formed inside the coils. One coil, 22b, is energized directly from secondary 24a of transformer 24. The other coil, 22a, is energized from secondary 24a through the electrodes 16, 18a, or 18b, and the electrode 20.

Coil 22a serves as a zero setting coil to fix the position of the stylus when no current flow occurs in coil 22b. Moreover, as is described in detail, in Spitzglass Patent 2,076,100, assigned to the same assignee as the present invention, the coil 22a cooperates with coil 22b to cause stylus deflection in accord with the ratio of the current flow therein and may be arranged in relation to the other elements of the meter to provide a stylus deflection in direct proportion to the fluid flow in pipe P so long as the instrument operates in its accurate range. The resulting chart indication may be integrated to ascertain the total integrated time rate of fluid flow.

The current flow in coil 22a is governed by which one of elements 16, 18a and 18b contacts with the fluid 14. This results from the circuit which may be traced from secondary 24a, through resistances 26, 26a, and 26b to electrode 16 and through electrode 20 and resistance 28, to coil 22a. As the fluid 14 rises to contact electrode 18a, resistance 26b is cut out of the circuit and, when electrode 18b is contacted, resistance 26a is additionally cut out. Thus as increased fluid flows through pipe P, the current flow in coil 22a increases and the stylus is shifted accordingly.

The transformer 24 is energized from an alternating voltage source 30.

The values of resistances 26, 26a, 26b and 28 are proportioned relative to each other and the other elements of the circuit to provide movement of the stylus substantially in direct proportion to the fluid flow through pipe P.

While only three electrodes and their associated resistances are shown in the drawing, it will be understood that many more are preferably used. Typically these are arranged in a spiral in chamber 12 and are of sufficient numbers to render negligible the increment of flow between successive electrodes.

While it is possible to cause the stylus movement to be substantially directly proportional to the rate of fluid flow it is nevertheless impossible to achieve an accurate indication in the low ranges of operation. This results from the exceedingly small change in level of fluid 14 in chamber 12 when the fluid flow rate varies about a small value. Practical considerations of manufacture and ease and reliability of operation render measurement of this small level difference impractical in an instrument required to measure relatively large rates of fluid flow. Consequently the measurement when the instrument operates in this condition cannot be relied upon.

In accordance with the present invention auxiliary means are provided to measure the time during which steam actually flows in pipe P but the rate of steam flow is less than the minimum rate capable of accurate measurement. Since the rate of flow under these conditions typically corresponds to a known rate of standby flow, this time measurement provides an indication of the actual quantity of fluid used. This quantity, when combined with the steam used during periods of greater flow, accurately measures the total use of fluid.

A time measuring device is indicated generally at 32. This device may, for example, include a revolution counter and a synchronous motor operative to energize that counter at a fixed speed when alternating current is applied thereto. In the circuit of the figure, this current is applied from transformer 24 through the circuit which may be traced from secondary 24a to switch 34, through device 32, and back to the secondary 24a through switch 36. When switches 34 and 36 are simultaneously closed device 32 is energized and time is measured. When either switch is open no time measurement takes place.

Switch 34 closes when the pressure in pipe P adjacent orifice O exceeds a predetermined value indicative of the fact that shut-off valve V is in the open position. This is accomplished by bellows 38 which is in fluid communication with pipe P and expands to engage the switch elements when predetermined pressure is exceeded. Other devices such as, for example, a Bourdon tube, may be used for this purpose.

The switch 36 is actuated by current flow in solenoid 40 and closes when this current flow exceeds a fixed value. Solenoid 40 is connected in series circuit with transformer secondary 24a and the cathode-anode space path of electron tube 42. The cathode-control electrode space path potential of this tube is determined by current flow in resistance 28 which is connected to the primary winding of transformer 44, the secondary winding of that transformer being connected to the cathode and control electrode of tube 42.

The transformer 44 is so connected that the control electrode of tube 42 is driven negative relative to the cathode when the anode is driven positive relative to the same. Consequently, the greater the value of current flow in resistor 28, the smaller will be the cathode-anode space current flow in tube 42 and the smaller will be the tendency of relay 36 to close.

The value of resistance 28 and the construction of transformer 44 are so chosen in relation to the other elements in the circuit that relay 36 opens when fluid 14 contacts the first electrode, namely electrode 16. Thus, so long as the fluid flow in pipe P exceeds the minimum value at which the first electrode is contacted, switch 36 is open and time measuring device 32 is not energized. However, when the fluid flow rate falls below this figure, switch 36 closes and time is measured for the period switch 34 is simultaneously closed.

The tube 42 acts as a rectifier to convert the alternating potential across winding 24a to periodic half wave current pulses of value determined by the cathode-control electrode space path voltage thereof. Capacitor 46 acts as a storage device to maintain a relatively constant flow through solenoid 40 to overcome any tendency of switch 36 to chatter because of the current pulsations.

From the foregoing description it will be evident that I have provided an improved device suitable for use with a fluid measuring device incapable of accurately measuring fluid flow in a predetermined range, namely the range wherein electrode 16 is not contacted. This device provides a count of the time during which fluid flows in this range and thereby overcomes the error otherwise associated with operation of the fluid flow meter.

It will be observed that meter 22 does not indicate at the time when device 32 is indicating. Consequently it is unnecessary to disregard any indications of the former since it shows a zero indication when fluid flow is in the inaccurate range. The integrated indication of meter 22 and the reading of device 32 may thus be added to obtain the total integrated fluid flow. Moreover, depending on the spread between the minimum flow under normal non-standby conditions and the maximum flow, the first electrode 16 may be located well above the neutral or no-flow position of liquid 14 and particularly reliable trouble-free operation secured by reason of this relatively great spacing.

While I have described a specific embodiment of my invention, it will, of course, be understood that I do not wish to be limited thereto and that in the appended claims I intend to cover all modifications and alternative constructions coming within the true spirit and scope of my invention.

What I claim as new and desire to secure by Letters Patent of the United States is:

1. A mechanism for use with a manometer having a plurality of vertically stepped electrodes operative to contact a conducting fluid in accord with the up and down movements of the same, the lowermost of said electrodes being free of the surface of said fluid when the same is in a neutral condition, said mechanism comprising a time measuring device, circuit means responsive to contact of the lowermost electrode with the fluid and operative to energize said device when said lowermost electrode is free of said fluid, and a flow indicating device responsive to time and controlled by contact of said electrodes with said fluid, said last device being inoperative when said lowermost electrode is free of said fluid.

2. A mechanism for use with a manometer responsive to the pressure difference across an orifice and having a plurality of vertically spaced electrodes operative to contact a conducting fluid sequentially as said pressure difference increases, the lowermost of said electrodes being free of the surface of said fluid when said pressure difference is below a predetermined minimum value, said mechanism comprising a time measuring device, a device responsive to the existence of predetermined fluid pressure on said orifice, means operative in response to said last device and to contact of the lowermost electrode with the fluid to energize said time measuring device when said lowermost electrode is free of said fluid and said predetermined fluid pressure exists, and a device responsive to time and controlled by contact of said electrodes with said fluid, said last device being inoperative when said lowermost electrode is free of said fluid.

3. A mechanism for use with a manometer responsive to the pressure difference across an orifice and having a plurality of vertically spaced electrodes operative to contact a conducting fluid sequentially as said pressure difference increases, the lowermost of said electrodes being free of the surface of said fluid when said pressure difference is below a predetermined minimum value, said mechanism comprising a device responsive to time and controlled by contact of said electrodes with said fluid, said device being inoperative when said lowermost electrode is free of said fluid, a device responsive to the fluid pressure at said orifice and operative to establish a predetermined circuit condition when said pressure exceeds a predetermined value, a time measuring device, and means responsive to the simultaneous existence of said last circuit condition and lack of contact of said lowermost electrode with said fluid and operative to energize said time measuring device.

4. A flow meter to measure the flow of fluid through a conduit comprising a flow responsive device responsive to flow through the conduit in excess of a predetermined minimum, a control device connected to the flow responsive device to be actuated thereby when the flow through the conduit is above said predetermined minimum, a time measuring device, and a connection from the control device to the time measuring device to disable the time measuring device when the control device is actuated whereby the time measuring device will be effective only when the flow is below said predetermined minimum.

5. A flow meter to measure the flow of fluid through a conduit comprising a flow responsive device responsive to flow through the conduit in excess of a predetermined minimum, a control device connected to the flow responsive device to be actuated thereby when the flow through the conduit is above said predetermined minimum, a time measuring device, a second control device connected to the conduit to be actuated in response to the pressure therein when the pressure exceeds a predetermined value, and connections from the time measuring device to both of the control devices to energize the time measuring device when the second control device is actuated and the first control device is deactuated.

6. A flow meter to measure the flow of fluid through a conduit comprising an electrical flow responsive device connected to the conduit and responsive to the flow therethrough, an electrically operated indicating device connected to the flow responsive device, means in the flow responsive device to complete an operating circuit to the indicating device when the flow in the conduit is above a predetermined minimum and to interrupt the circuit when the flow is below said minimum, a time measuring device and control means for the time measuring device connected to the flow responsive device and responsive to interruption of the circuit thereby to energize the time measuring device.

7. A flow meter to measure the flow of fluid through a conduit comprising an electrical flow responsive device connected to the conduit and reponsive to the flow therethrough, an electrically operated indicating device connected to the flow responsive device, means in the flow responsive device to complete an operating circuit to the indicating device when the flow in the conduit is above a predetermined minimum and to interrupt the circuit when the flow is below said minimum, a time measuring device, a control device connected to the flow responsive device to be actuated in response to interruption of the circuit thereby, a second control device connected to the conduit to be actuated when the pressure therein exceeds a predetermined minimum value, and connections from the time measuring device to the control devices to energize the time measuring device when both of the control devices are actuated.

3. A mechanism for use with a manometer having a conducting fluid and a plurality of vertically spaced electrodes operative to contact said fluid as the same moves up and down, said mechanism comprising a time measuring device, elements controlled by said electrodes in response to the fluid level falling below a predetermined minimum level and effective only when the fluid is below said level to energize said time measuring device, and a flow indicating device responsive to time and controlled by contact of said electrodes with said fluid only when the fluid level is above said predetermined minimum level.

ROBERT A. ACKLEY.

References Cited in the file of this patent

UNITED STATES PATENTS

| Number | Name | Date |
|---|---|---|
| 268,733 | Schmidt | Dec. 5, 1882 |
| 287,283 | Heinle | Oct. 23, 1883 |
| 1,108,721 | Dodge | Aug. 25, 1914 |
| 1,325,763 | Spitzglass | Dec. 23, 1919 |
| 1,794,808 | Tingley | Mar. 3, 1931 |
| 2,018,538 | Webb | Oct. 22, 1935 |

FOREIGN PATENTS

| Number | Country | Date |
|---|---|---|
| 278,992 | Italy | Oct. 27, 1930 |